United States Patent Office 3,704,271
Patented Nov. 28, 1972

3,704,271
POLYOLEFIN-STARCH
Helmut F. Prahl, Middleton, Wis., and Frederick M. Hart, Kent, Wash., assignors to Dynatron Research Corporation, Madison, Wis.
Continuation-in-part of application Ser. No. 735,045, June 6, 1968. This application Oct. 29, 1970, Ser. No. 85,041
Int. Cl. C08f 25/00
U.S. Cl. 260—17.4 GC      18 Claims

ABSTRACT OF THE DISCLOSURE

A polyolefin-modified starch where an olefin is polymerized directly upon the surface of starch to yield a starch/polyolefin composite (SPS). SPS is prepared by polymerizing an olefin monomer on the surface of starch upon which a suitable catalyst has been adsorbed, preferably a catalyst of the Ziegler-Natta type, i.e. an organo-metallic transition metal catalyst system. These surface polymerized polyolefin starches (SPS) are useful in a wide variety of applications including their use in water-resistant adhesives and binders, paper sizes and coatings, textile sizes, paint extenders, and a wide variety of other uses.

---

This application is a continuation-in-part of our copending application Ser. No. 735,045 filed on June 6, 1968, now abandoned.

This invention relates to polyolefin-modified starch. More particularly this invention relates to polyolefin starch where the olefin is polymerized directly upon the surface of the starch to yield a starch/polyolefin composite, i.e. surface polymerized (SPS).

This invention also relates to a process of producing SPS which is characterized by polymerizing an olefin monomer on the surface of starch upon which a suitable catalyst has been adsorbed, preferably a catalyst of the Ziegler-Natta type such as an organo-metallic-transition metal catalyst system.

This invention relates also to uses for SPS which includes their use in water-resistant adhesives and binders, paper sizes and coatings, textile sizes, paint extenders, and a wide variety of other uses.

The invention may be better understood by reference to the following description and the accompanying drawings in which.

Figure 1:
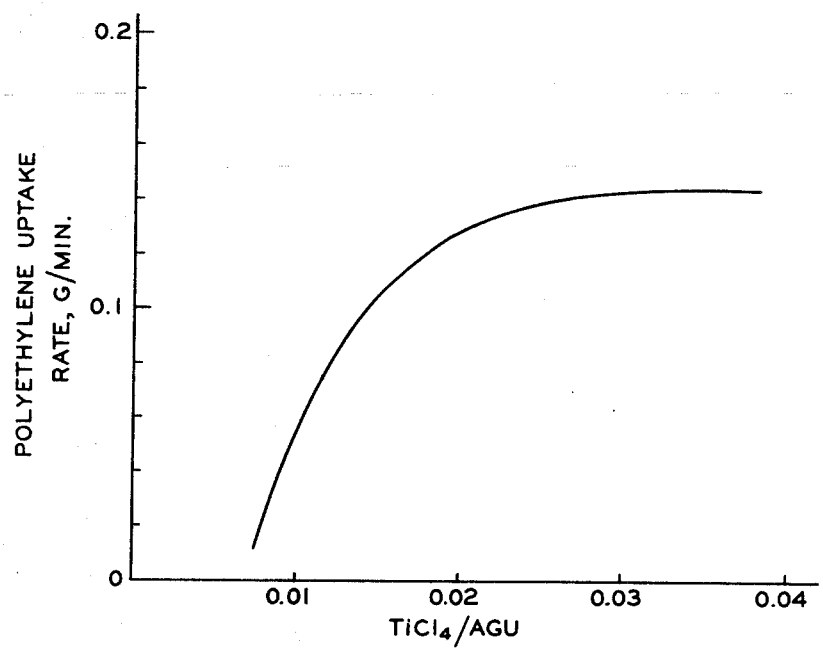
FIG. 1 is a graph presenting the rate of polyethylene uptake (gram/min.) as a function of the TiCl$_4$/AGU molar ratio.

AGU is an anhydro-glucose unit.

Starch, a natural occuring, high-polymeric carbohydrate composed of alpha-glucopyranose units joined together by alpha-1,4-glycosidic linkages is too well known to require further description. It is described in many well known publications, for example, in Starch by Whistlier and Paschall, vols. I and II (1965 and 1967) which is by reference incorporated into the present application as if a part hereof.

It is the reserve carbohydrate of plants, is widely distributed in nature and provides a very inexpensive and almost inexhaustible raw material source. For example, starch is obtained from cereals such as corn in the Americas, potatoes in Europe and from rice or manihot (cassava or tapioca) roots in the Orient.

Since corn is the largest grain crop thus making corn starch the principal industrial starch of the United States, it will be used to illustrate the present invention. Because of its low cost and suitability, starch is widely used by industry.

Although it has many beneficial properties, starch also has certain deficiencies. For example, starch is water sensitive, will swell progressively in water and then gelatinate so that it is widely used, for example, in adhesives. However, long contact with water and/or elevated temperature tends to excessively break down starch so that excessive degradation deleteriously effects the function of the product. Therefore, starch has been modified chemically and/or physically to improve its properties for certain applications in order to maximize the desirable properties of starch and minimize its undesirable properties.

We have now discovered a unique form of polyolefin-starch (also referred to as SPS or starch/polyolefin composites) which is different from starch itself. This product preserves and/or maximizes many of the beneficial properties of starch while minimizing many of its undesirable properties.

SPS starch is entirely different from any product which can be made by mechanically mixing starch and a preformed polyolefin such as by spraying, dipping, milling or other means of coating starch with separately prepared polymer. In SPS the polymer forms directly on and tenaciously adheres to the outer surface of each individual starch particle thus forming a starch-polyolefin composite and is in fact polymerized upon the surface of the starch. The surface polymerized starch of discrete particles is such that there is a physical combination of polyolefin with starch without any chemical bond uniting the starch and the polyolefin.

In general, when properly prepared, SPS is a fine, free-flowing hydrophobic powder. This is particularly true of low concentrations of polyolefins.

As the polymerization is continued for longer times in order to build up higher proportions of the polymer, the skin first formed does not necessarily remain of uniform thickness but the polymer may form rounded bumps, nodules, or protuberances on the outer surface of the skin. Even though thick layers or skins of the polymer are built up on the starch particles, when properly prepared the polymer on one particle does not appear to joint to any appreciable extent with the polymer on another particle during polymerization. Thus, for all practical purposes, individual coated starch particles remain as separate and discrete particles. Heavy polyolefin concentrations may produce some degree of agglomeration.

Any olefin capable of being polymerized on starch in accord with this invention can be employed such as for example any olefin capable of being polymerized by a Ziegler-Natta type catalyst.

These include aliphatic olefins such as the 1-olefins, most particularly those having less than six carbon atoms. Higher olefins can also be used where desirable.

These are illustrated by the lower 1-olefins such as ethylene, propylene, butene-1, etc. These 1-olefins may be employed to form homopolymers, hetero-polymers, copolymers, block or graft polymers, etc. on starch. In addition, other monomers which are known to copolymerize with olefins to form useful products may be employed.

For most purposes we prefer to use ethylene or propylene which have the outstanding advantages of being gases at ordinary temperatures, of being relatively inexpensive and available in large quantities, and of producing polymers of high molecular weight having very desirable properties.

Any catalyst capable of being adsorbed on starch and capable of polymerizing olefins in accord with this invention can be employed. These are best exemplified by the Ziegler-Natta type catalysts, i.e. organo-metallic-transition metal catalyst systems. The components of such catalyst systems react when mixed together to produce a highly reactive substance capable of acting as polymerization catalyst for olefins.

Since the olefin is polymerized directly on the surface of starch, it is important to create reactive catalyst sites thereon so that polymerization chains will grow on and from these sites as the polymerization reaction proceeds.

A convenient way to produce such reactive polymerization sites on the starch is to first treat starch with one component of a suitable catalyst system and then with the other component of the catalyst system. This procedure yields active catalyst sites on the starch. If both components of the catalyst system are immediately mixed and then immediately added to starch, reactive catalytic sites can also be formed.

Catalyst systems which are useful in the process of this invention include any two or more component systems which, when mixed together, react to form a material that initiates the polymerization of the 1-olefins, and which have at least one component that reacts with or becomes fixed in some way on starch when brought in contact therewith. In general, we have found that two component systems which are particularly suitable are those in which one component is an organometallic reagent such as an alkyl or aryl derivative of one of the following metals: lithium, sodium, potassium, magnesium, calcium, zinc, cadmium, boron, or aluminum, and the other component is a transition metal compound such as a halide or ester of titanium, zirconium, vanadium or chromium. Other similar catalyst systems or modifications thereof can be used as will be apparent to those skilled in the art of producing polyolefins. An excellent short summary of "Polyolefin Resin Processes" by Marshall Sittig (Gulf Publishing Co., 1961) presents catalysts and processes and is hereby incorporated by reference as if part hereof.

As will also be evident to those skilled in the polymer art, it is important when using one of the catalyst systems noted above to conduct the polymerization under substantially oxygen-free and anhydrous conditions since the activity of the catalyst system is impaired by the presence of any substantial amount of oxygen or water. We have found, however, that more water than usual can be tolerated in the system when treating starch according to our invention. A small fraction of 1% of moisture retained within the starch does not appear to interfere with the reaction and may in fact have a beneficial effect.

One simple and convenient way of carrying out this process is by the slurry method in which starch is suspended in a suitable liquid medium such as an organic liquid, for example a hydrocarbon that does not dissolve or react with either starch or the polymer to be formed. Starch may be treated with one of the catalyst components before or after it is placed in the suspending liquid. The other catalyst component is then brought into contact with the starch, or the two catalyst components may even be added to the suspending liquid simultaneously with the starch. The slurry of catalyst treated starch in the organic liquid, after the second component of the catalyst has been added, is placed in a closed reaction vessel and the monomer is fed into the vessel at a suitable rate while maintaining the slurry under agitation. We have also found that polymerization also occurs when only one component of the catalyst system is employed, but usually at a less rapid rate. The one component catalyst is preferably titanium halide. Provisions should be made to control the temperature of the reaction vessel, and the reaction should be carried out under reasonably anhydrous conditions. As polymerization proceeds, the slurry becomes thicker and reaction is stopped at any desired stage, depending upon how much of the polymer is to be formed. The slurry can then be removed from the reaction vessel and simply pressed or filtered to remove the free organic liquid and then washed in water, methanol or other materials which easily dissolve out the bulk of the catalyst residue.

The polymerization reaction may be carried out at atmospheric pressure, or higher pressures if desired, and over a wide range of temperature. Ordinarily, depending on the olefin, the polymerization proceeds rapidly at atmospheric pressure and at a temperature between about 20° C. and about 100° C. The amount of polymer formed will vary with the time of the polymerization reaction, the particular catalyst used and the particular monomer or monomers being polymerized. Useful products are obtained by forming a total amount of polymer on the starch amounting to anywhere from around 1% or less of the weight of the starch up to amounts of polymer greater than the weight of the starch. Usually a polymerization time of about one-half to twelve hours suffices to produce the most desirable products containing about 1 to 50% of polymer by weight, such as 1–30%, but preferably 1–10% although shorter or longer times may be employed. By forcing the reaction large amounts of polyolefin can be deposited.

Since the reaction can take place on any suitable starch surface, the size of the starch particles can vary widely. Large and small particles can be employed depending on the type of starch employed, the desired results and ultimate use. In general, it is desirable to employ small, discrete particles of starch, for example particles of from about 0.05 to 100 or more microns, such as from about 1 to 50 microns, for example from about 1.5 to 25 microns, but preferably from about 4 to 6 microns. Larger or smaller particles can also be employed when suitable.

The following examples are presented for purposes of illustration and not of limitation.

The general procedure for the preparation of starch/polyolefin composites (SPS) consists of dispersing native starch in a suitable solvent, for example benzene, xylene, etc. and removing all traces of moisture azeotropically. Working under a nitrogen blanket, a measured amount of titanium tetrachloride (or trichloride) is then introduced and allowed to adsorb onto the starch surface for a period of several minutes. To the resultant yellow dispersion the appropriate amount of aluminum alkyl (i.e. triethyl, triisopropyl, triisobutyl, etc.) is added, whereupon the color turns to gray, brown or black. The starch/catalyst slurry so formed may then be reacted with olefin in any of several ways; for example, ethylene gas may be introduced directly into the reaction mixture under atmospheric pressure. The reaction mixture can also be transferred to a pressure vessel and reacted with propylene gas under pressure. Upon completion of the polymerization the SPS is recovered by filtration and residual catalyst is discharged with methanol.

The Ziegler-Natta catalyst systems utilized for the preparation of starch/polyolefin composites consist of coordination compounds derived from various transition metal halides and organometallic species of group II–A or III–B metals. Typical combinations are based on titanium halides such as trichloride or tetrachloride and trialkyl aluminums such as triethyl aluminum or triisobutylaluminum. These catalyst systems become inactivated when in contact with air or moisture. The aluminum alkyl is particularly sensitive and will spontaneously ignite on contact with air.

EXAMPLE 1

100.0 grams of Argo brand corn starch (about 5 microns) were refluxed under a water trap with 1000 ml. of benzene. When the evolution of water creased, 9.5 ml. had been collected in the trap. The remaining slurry of 90.5 grams of starch was cooled to room temperature, then placed in a water bath maintained at 20° C. The slurry was blanketed with nitrogen and 2.35 grams (0.0124 mole) of TiCl₄ were added. The slurry turned a bright yellow and was stirred for 30 minutes to permit adsorption of the catalyst by the starch. No visible change occurred during this period. When the adsorption period was completed, 1.07 grams (0.00937 mole) of triethylaluminum were added. The reaction mixture immediately turned a dark brown. Polymerization grade ethylene was then introduced for 50 minutes at a rate of 0.200 gram per minute. At the end of this period, the catalyst was deactivated with methanol and the product recovered by suction filtration. After three methanol washes, the product was free of benzene and as white as unreacted starch. After oven drying overnight at 50° C. the yield was found to be 99.3 grams of a free-flowing powder. The presence of polyethylene in this composite was demonstrated by the non-wetting nature of the product and by hydrolysis of a 20.00 gram sample with 100 ml. of 6 N hydrochloric acid to yield 6.4% of polyethylene.

EXAMPLE 2

Into a 1000 ml. three-necked flask were placed a magnetic stirrer bar, 100.0 grams of Argo brand corn starch, and 500 ml. of benzene. The flask was fitted with a condenser and water trap and refluxed until no more water could be separated, at which point 9.7 ml. had been collected. The resultant slurry of 90.3 grams of starch was cooled to room temperature and thermostated at 20° C. After displacement of air with nitrogen, the slurry was treated with 2.44 grams (0.0129 mole) of TiCl₄ for 30 minutes with magnetic stirring. Upon completion of the adsorption period, 1.15 grams (0.010 mole) of triethylaluminum were added to the yellow mixture, turning it dark brown immediately. The flask was next fitted with a gas adsorption tube through which polymerization grade propylene was added at a rate of 0.200 gram per minute for 50 minutes. At the end of this period the propylene flow was shut off and the product recovered by suction filtration. After three methanol washes the starch/polypropylene composite was free of color and benzene. The product was dried overnight at 50° C. to yield 94.0 grams of a white, free-flowing powder. This product was resistant to wetting by water although hydrolysis with 6 N hydrochloric acid revealed only 0.55% polypropylene to be present.

EXAMPLE 3

Into a 200 ml. two-necked flask fitted with a reflux condenser, water trap and magnetic stirring bar were placed 30.0 grams of Argo brand corn starch and 75 ml. of benzene. Removal of water by azeotropic distillation yielded 2.6 ml. The dry starch slurry so prepared was treated with 0.54 gram (0.0028 mole) of TiCl₄ and stirred magnetically for 30 minutes. Next 0.43 gram (0.0022 mole) of triisobutyl aluminum were added and the catalyzed starch slurry was transferred to a pressure reactor equipped with a Pyrex liner from which air had been displaced with dry nitrogen. The autoclave was sealed, placed in a rocking heating mantle and connected to cylinder of propylene gas. The mixture was reacted at 30° C. for four hours, during which period propylene gas was supplied continuously at 138 p.s.i. from the cylinder. The product was recovered as before by suction filtration and methanol washing. Hydrolysis with 6 N hydrochloric acid demonstrated the presence of 2.9% of polypropylene in this product.

EXAMPLE 4

Into a 1000 ml. three-necked flask were placed 100.0 gram of Argo brand corn starch, 500 ml. of benzene and a magnetic stirrer bar. The flask was fitted with a reflux condenser and water trap and the mixture was refluxed, removing 12.2 ml. of water. To the remaining slurry of 87.8 grams of dry starch blanketed with nitrogen and thermostated at 30° C., were added 1.14 grams (0.00601 mole) of TiCl₄. The TiCl₄-catalyzed starch was stirred magnetically 30 minutes followed by introduction of propylene for four hours at a rate of 0.425 gram per minute. No aluminum alkyl was introduced. After recovering the product with the usual filtration and methanol washes, 90.8 grams of dry free-flowing powder were obtained. Although this starch/polypropylene composite was highly resistant to wetting with water, hydrolysis with 6 N hydrochloric acid indicated only 0.55% polypropylene.

The preparation of SPS was studied under a wide variety of conditions involving more than one hundred preparations. From these runs certain conclusions could be drawn in regard to optimum conditions to be employed and the most significantly critical variables.

In general, the preparation of starch/polyethylene composites was carried out with rapidity and facility by bubbling ethylene gas directly into the starch/catalyst slurry. Two reaction variables, i.e. TiCl₄/AGU and Ti/Al molar ratios were found to be of particular significance in producing the optimum product. Other reaction parameters could be varied over a broad range without significantly affecting polymerization or the characteristics of the resultant SPS.

It was found that in the case of ethylene the TiCl₄/AGU ratio (i.e. the molar ratio of titanium tetrachloride per anhydroglucose unit) affected the kinetics of the reaction. This is clearly evident in FIG. 1 where the rate of polyethylene takeup is plotted as a function of TiCl₄/AGU ratio. As indicated in FIG. 1, the reaction kinetics are substantially independent of the ratio when it exceeds about 0.020. However, at values below 0.020 both the utilization and polymerization rate of ethylene progressively decreased.

The point of inflection in FIG. 1 at TiCl₄/AGU ratios of around 0.020 is of interest in connection with the formation of homopolymers not associated with starch. Such homopolymers are derived from the fact that the adsorption isotherm for titanium tetrachloride onto starch requires that a certain quantity of titanium tetrachloride always be present in solution which is in equilibrium with TiCl₄ adsorbed on the starch surface. This amount of titanium tetrachloride in solution leads to the production of homopolymer not associated with starch. The quantity of titanium tetrachloride in solution decreases as the overall amount of titanium tetrachloride charged to the reaction is reduced, thereby inferring that homopolymer formation may be minimized by working with the lowest charge of titanium tetrachloride consistent with reasonable reaction rates. Thus, a TiCl₄/AGU ratio of about 0.020 is the highest which is usually justified in relation to minimizing the formation of homopolymer.

Titanium/aluminum molar ratio (Ti/Al) defines the composition of the catalyst and is of importance to the satisfactory preparation of starch/polyethylene composites with ethylene levels above about 3%. Unless this ratio is controlled, the SPS composites of more than about 3% polyethylene tend to agglomerate. The optimum Ti/Al ratio is around 1.25–1.45 and permits the reproducible production of free-flowing, non-agglomerated composites with ethylene levels up to about 10%. Composites with ethylene levels between 5% and 8% were less reproducible in this respect and were obtained either as free-flowing powders or as agglomerated species. Composites with polyethylene levels in excess of about 10% tend to be more agglomerated.

Reference has already been made to the fact that not all of the titanium tetrachloride introduced to the reaction is adsorbed onto the starch, thereby providing a mechanism for the formation of homopolymer not associated with starch. This problem is further compounded by the aluminum alkyl which is adsorbed less readily on the starch surface than is titanium tetrachloride and has some ability to catalyze the polymerization of olefins even in the absence of titanium tetrachloride. Accordingly it is desirable to operate minimum catalyst levels consistent with adequate reaction rates. As reported above, the reaction rate becomes independent of catalyst concentration at TiCl$_4$/AGU ratios in excess of about 0.020 and hence there is no practical reason to exceed this value.

Since either catalyst component has the ability to independently catalyze the polymerization of olefins, although to a lesser degree than in combination, and since the adsorption of titanium tetrachloride on starch is more favored over that of the aluminum alkyl the latter can be eliminated altogether. The preparation of starch/polyethylene composites SPS with titanium tetrachloride alone proceeds much more slowly than when the catalyst is employed with aluminum alkyl and yields lower polymer levels. Homopolymer formation was also very greatly reduced. Starch/polyethylene composites so prepared, i.e. with TiCl$_4$ alone demonstrate typical polyolefin-composite properties at exceptionally low polymer levels. Products with well under 1% of polyethylene have very low coefficients of friction and very low wettability by water.

The nature of the polyethylene surface was also investigated. Since Ziegler-Natta catalyst systems are heterogeneous, adsorption and hence polymer growth occurs at discreet locations. Microscopic observations show this to be the case at polyethylene levels in excess of about 3%. Such composites exhibit a progressively more knobby character as the polyethylene level increases. However, at polyethylene levels below 3% there is little visual indication of polyethylene except that the characteristic Maltese cross under polarized light is somewhat more diffuse. Nevertheless, such composites are quite hydrophobic even at very low polyethylene levels such as at levels well under 1%. Thus, polyethylene at less than 3% presents a more or less uniform film.

Thus, it appears that the initial polyethylene growth is two dimensional, radiating out from discreet catalyst particles. When the polyolefin polymer film coats the entire starch granule, further polyethylene formation then becomes three dimensional at the site of catalyst particles.

Thus, for certain uses, starch/polyethylene composites with around 3% polyethylene are of particular interest. They represent species with smooth surfaces. Composites with less than 3% polyethylene retain some free starch surface, while those with more than 3% polyethylene have more complex surface geometries which may alter their properties in more or less useful configurations depending on the particular application.

Agglomeration of starch/polyethylene composites appears to occur in the same range of composition within which the knobby structures are observed making it likely that the knobby structures are a contributing factor in agglomeration.

Certain differences were noted in the preparation of starch/polypropylene composites as compared to starch/polyethylene composites. Since propylene is more difficult to polymerize than ethylene, more drastic conditions were required such as higher propylene concentrations, longer reaction times, higher temperature and/or higher pressures. Even with these variations it was easier to achieve very high polyethylene values than to achieve high polypropylene values.

Figure 2:
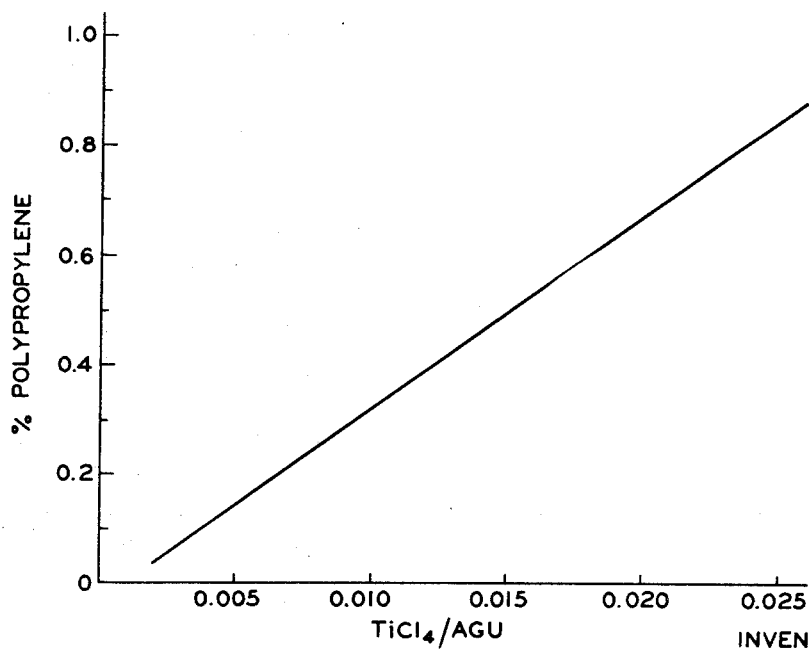
FIG. 2 is a graph presenting the percent polypropylene content of SPS as a function of TiCl$_4$/AGU molar ratios at atmospheric pressure at a Ti/Al molar ratio of 0.8.

As is the case of ethylene, an increase of TiCl$_4$/AGU ratio leads to progressively higher levels of polypropylene in the product as demonstrated in FIG. 2. There appears to be no inflection point within the range specified in FIG. 2. However, an inflection point may occur at a higher level.

With propylene in regard to the Ti/Al molar ratio, it appears that this ratio does not control the agglomeration characteristics of starch/polypropylene composites as it does in the case of starch/polyethylene composites. In fact, agglomeration is rarely encountered in products derived from polypropylene and is therefore not a serious problem.

Figure 3:
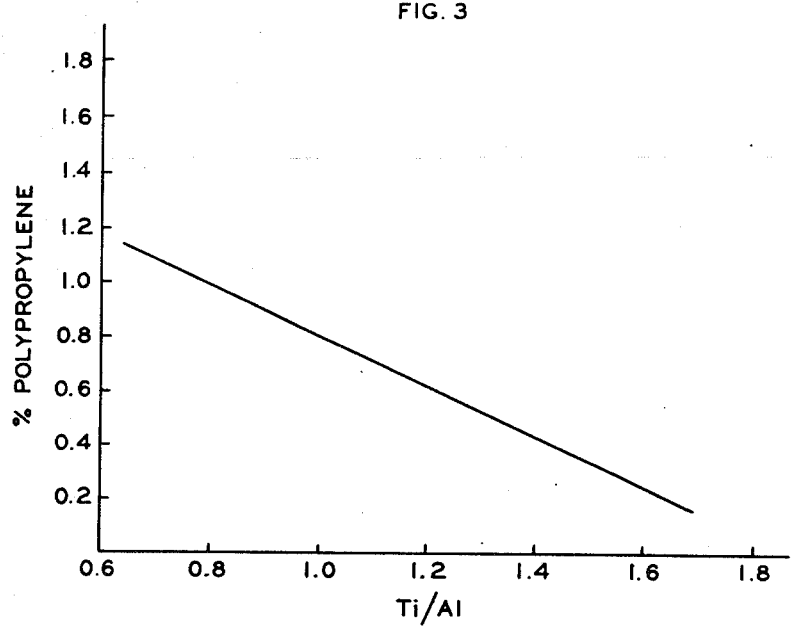
FIG. 3 is a graph of the percent polypropylene in SPS as a function of Ti/Al molar ratios at atmospheric pressures where the TiCl$_4$/AGU molar ratio is 0.023.
Figure 4:
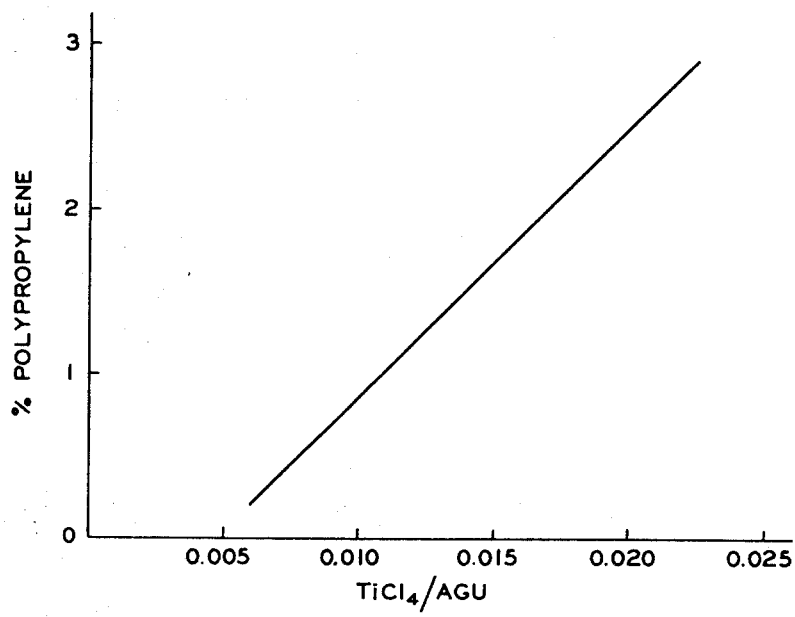
FIG. 4 is a graph of the percent polypropylene in SPS as a function of TiCl$_4$/AGU molar ratios employing a pressure of 138 p.s.i. and a Ti/Al molar ratio of 0.8.

However, it is to be noted in FIG. 3 that the Ti/Al molar ratio does have a marked influence on the polypropylene level attained in the final product, with values in the range of 0.6–0.7 yielding the highest percent of polypropylene in the composite.

As in the case of starch/polyethylene composites, some free catalyst in solution will always be in equilibrium with that adsorbed on the starch surface. This free catalyst can lead to the formation of homopolymer not associated with starch. As in the case of the ethylene analogues, the use of a catalyst composed only of titanium tetrachloride greatly reduced homopolymer formation. Both the utilization of ethylene and the polymer level in such composites were of a very low order of magnitude. However, the products again demonstrated an exceptionally high degree of composite properties at low polymer levels. For example, a starch/polypropylene composite prepared according to this technique and containing only 0.25% polypropylene was completely non-wetting with water.

Attempts to operate at low TiCl$_4$/AGU ratios with propylene were successful, although less so than in the case of starch/polyethylene composites. While homopolymer formation under these conditions was reduced, the formation of polymer in association with starch was also drastically reduced and there is no evidence to indicate that the reduction in the former is greater than that in the latter. Because of the greater difficulty of polymerizing propylene relative to ethylene, low TiCl$_4$/AUG ratios drastically reduced the polymerization of propylene and hence are less practical than in the case of ethylene.

Whereas polyethylene on the surface of starch granules was readily visible microscopically as discreet nodules at polymer levels in excess of about 3%, such visual evidence for their presence in polypropylene could not be adduced even at high polypropylene levels. This was true despite extensive studies in polarized light, various immersion fluids, and the use of phase contrast techniques. Moreover, where the starch component of polypropylene composites with relatively high polypropylene levels was removed by hydrolysis, there were obtained polypropylene coatings approximating the starch granules in size and covered with nodules.

A convenient method of determining the amount of olefin in SPS was used employing 6 N hydrochloric acid. At this concentration the starch within the polyolefin coating was hydrolyzed within 24 to 36 hours with virtually no color formation. The residual polyolefin could be filtered off, washed, and dried to obtain a quantitative measure of polyolefin content in the parent composite. An added advantage of this procedure is that the polyolefin coating is damaged to only a minimal extent and may be examined microscopically to reveal its shape and nature.

Blank runs with starch invariably yielded a small, non-hydrolyzable starch fraction which persisted even upon prolonged hydrolysis or hydrolysis at elevated temperatures. In the case of starch exposed to Ziegler-Natta catalysts for equivalent periods of time but without monomer feed, this non-hydrolyzable fraction amounted to 0.65%.

The following example is presented to demonstrate the hydrolysis procedure for determining polyolefin content.

EXAMPLE A

Into a 250 ml. Erlenmeyer flask were placed 20.00 grams of polyolefin-starch composite and 100 ml. of 6 N hydrochloric acid to which ½ drop of Tergitol NPX surfactant (Union Carbide) had been added. Usually the composite could be dispersed in the acid by swirling of the flask and attack of the acid upon the substrate was indicated by a substantial increase in viscosity within about 30 minutes. Occasionally non-wetting composites required dispersion with a stirring rod. The viscosity quickly reached a peak and then decreased again. After standing at room temperature for 24 hours, the reaction consisted of a clear, aqueous solution containing the white polyolefin coatings. The latter were recovered by suction filtration with ordinary filter paper. However, because of the small size of the coatings clogging up the filter paper resulted and frequently filtration was tedious. The white powder so obtained was washed with water to remove residual hydrochloric acid, oven dried and weighed. Blank runs with starch invariably yielded a small, non-hydrolyzable starch fraction which persisted even upon prolonged hydrolysis or hydrolysis at elevated temperatures. In the case of starch exposed to Ziegler-Natta catalysts for equivalent periods of time but without monomer feed, this non-hydrolyzable fraction amounted to 0.65%.

Uses

SPS can be employed in a wide variety of applications, for example, in those applications where starch is now being employed, and most particularly in those starch applications where hydrophobic properties and/or water resistance is desired.

In many industrial uses, there is interproduct competition between the various kinds of starch and also between starches and other products. For example, resin glue, because of its greater resistance to moisture, has largely replaced starch in plywood latex is replacing starch in textile finishes; and natural gums such as guar offer competition in paper making. Synthetic polymers have specific properties which enable them in many cases to displace starch or prevent its wider usage.

We have now discovered that SPS has unique properties which allow it to improve on starch and to resist the tide of interproduct competition.

Thus, SPS is useful in coatings, sizings, adhesives or binders, in paints, in polishes, etc. For example, SPS is useful in the paper industry as a size to improve the appearance and erasibility, to inhibit ink penetration, to form a hard surface for writing and printing, etc.; in paper coatings; in paper adhesives, etc. to improve wet strength papers, etc. In the textile industry SPS may be employed in the following areas: (a) as a size to strengthen warp yarns and improve their resistance to abrasion during weaving; (b) in finishing, to change the hand and appearance of fabric after it is bleached, dyed or printed, (starch in this application is sometimes used as in binder for other materials, such as clay or in conjunction with thermosetting resins); (c) in printing, to improve the consistency of printing pastes; (d) as a component in finishes to glaze and polish sewing thread, etc. All textile materials are herein included, such as cotton and the like and all other textile materials wherein starch is used.

SPS may be used in oil well drilling muds, paints, printing inks, ceramics, core binders, as carriers for insecticides or herbicides, as fillers in resin formulations, etc.

They are particularly useful as water resistant adhesives and binders, for example in the manufacture of multi-wall paper sacks, in the manufacture of corrugated board, in the manufacture of laminated fiberboard, in metal foil linings, in adhesives for washable wallpaper, in bottle labelling, in billboard posting, etc.

In general, SPS may be employed in applications where starch or starch derivatives are now employed where water and/or moisture resistance and/or the unique properties of SPS are desired.

The following useful examples are presented for purposes of illustration and not of limitation.

Use.—Example 1

A water resistant starch adhesive was prepared by pasting a 1:1 blend of native corn starch and a SPS starch/polyethylene composite containing 9.4% polyethylene. The resultant adhesive was used to prepared lap joints on wet strength paper. After air drying, these joints were oven cured at 190° C. for 2.5 minutes. Joints so prepared were compared to similar ones prepared from native starch by stressing them to 1.25 p.s.i. and immersing them in water at room temperature. Time to failure was noted:

| Paste type | Cure, °C./2.5 minutes | Time to failure | |
|---|---|---|---|
| | | minutes | hours |
| Corn starch | None | 20 | |
| Do | 190 | 15 | |
| 1:1 starch:composite | 190 | | 7 |

Use.—Example 2

A standard latex paint was modified by the addition of 10% of a SPS starch/polyethylene composite containing 9.4% polyethylene. Control samples with 10% of native starch and 10% of micro-powdered polyethylene were similarly prepared. The paints were applied to test panels and scrubbed with 1% detergent solution. Cycles to failure were noted:

Paint type: Cycles to failure
- Unmodified _____ 126
- With 10% starch _____ 122
- With 10% powdered polyethylene _____ 146
- With 10% starch/polyethylene composite _____ 209

The terms and expressions which have been employed herein are used as terms of description and not of limitation. There is no intention in the use of such terms and expressions of excluding any equivalents of the features shown and described herein. It is recognized that various modifications are possible within the scope of the invention. For example, the term "starch" includes starches from whatever sources derived whether from corn, potato, rice, tapioca, arrowroot, sago, wheat, or other sources. It also includes modified starches which are capable of being surface polymerized and to uses where such starches or modified starches may be suitably employed.

Having thus described our invention what we claim as new and desire to obtain by Letters Patent:

1. Surface polymerized polyolefin starch of discrete particles, each of said particles being a starch particle with poly(1-olefin) directly on and tenaciously adhering to the surface thereof.

2. The product of claim 1 where poly(1-olefin) is polyethylene, polypropylene or polymers of mixtures of ethylene and propylene.

3. A process of preparing the product of claim 1 which comprises (1) treating discrete particles of starch with a catalyst selected from the group consisting of an organometallic transition metal type catalyst, a titanium halide, a zirconium halide, a vanadium halide and a chromium halide, said catalyst being capable of being adsorbed on the surface of each of said discrete particles of starch and of polymerizing aliphatic 1-olefin on said surface of each of said discrete particles of starch so as to form reactive catalyst sites on said surface of each of said discrete particles of starch, and (2) polymerizing in a substantially oxygen-free atmosphere aliphatic 1-olefin directly on and tenaciously adherent to the surface of each of said discrete particles of starch by contacting said so-catalyst treated discrete particles of starch with aliphatic 1-olefin at said so-formed reactive catalyst sites.

4. The process of claim 3 wherein said catalyst is an organometallic transittion metal type catalyst.

5. The process of claim 3 where aliphatic 1-olefin is ethylene, propylene or mixtures thereof.

6. The process of claim 4 where aliphatic 1-olefin is ethylene, propylene or mixtures thereof.

7. The process of claim 4 wherein said discrete particles of starch are treated in (1) first with one component of said two component organometallic transition metal type catalyst and then with the second component thereof to form said reactive catalyst sites on said surface of each of said discrete particles of starch.

8. The process of claim 7 where said first catalyst component is a titanium halide and said second component is an alkyl aluminum.

9. The process of claim 8 where said titanium halide is TiCl$_3$ or TiCl$_4$ and said alkyl aluminum is trialkyl aluminum.

10. The process of claim 3 where said catalyst consists of a titanium halide.

11. The process of claim 7 where aliphatic 1-olefin is ethylene, propylene or mixtures thereof.

12. The process of claim 8 where aliphatic 1-olefin is ethylene, propylene or mixtures thereof.

13. The process of claim 9 where aliphatic 1-olefin is ethylene, propylene or mixtures thereof.

14. The process of claim 10 where aliphatic 1-olefin is ethylene, propylene or mixtures thereof.

15. A water resistant starch adhesive comprising a blend of untreated starch and the surface polymerized starch of discrete particles of claim 1.

16. A latex paint comprising the surface polymerized starch of discrete particles of claim 1, said paint being free of untreated starch.

17. Paper comprising the surface polymerized starch of discrete particles of claim 1, said paper being free of untreated starch.

18. A textile comprising the surface polymerized starch of discrete particles of claim 1, said textile being free of untreated starch.

References Cited

UNITED STATES PATENTS

| | | | |
|---|---|---|---|
| 2,922,768 | 1/1960 | Mino et al. | 260—17.4 |
| 3,044,972 | 7/1962 | Segro et al. | 260—17 |
| 3,061,471 | 10/1962 | Brockway et al. | 117—139.5 |
| 3,121,698 | 2/1964 | Orsino et al. | 260—2.5 |

WILLIAM H. SHORT, Primary Examiner

L. L. LEE, Assistant Examiner

U.S. Cl. X.R.

117—156; 161—250, 265; 252—8.5 C; 260—296 XA